United States Patent
Kolstad et al.

(10) Patent No.: US 6,543,382 B1
(45) Date of Patent: Apr. 8, 2003

(54) SIDE OUTLET MILKING CLAW

(75) Inventors: Russell Kolstad, Waunakee, WI (US); David J. Luzader, Cleveland, TN (US)

(73) Assignee: DeLaval, Inc., Waunakee, WI (US)

( * ) Notice: Subject to any disclaimer, the term of this patent is extended or adjusted under 35 U.S.C. 154(b) by 0 days.

(21) Appl. No.: 10/071,848

(22) Filed: Feb. 8, 2002

(51) Int. Cl.[7] .................................................. A01J 5/00
(52) U.S. Cl. .................................................. 119/14.54
(58) Field of Search ............................ 119/14.54, 14.55, 119/14.37

(56) References Cited

U.S. PATENT DOCUMENTS

| | | | |
|---|---|---|---|
| 4,136,639 A | 1/1979 | Noorlander | 119/14.55 |
| 5,052,341 A | 10/1991 | Woolford et al. | 119/14.02 |
| 5,076,211 A | 12/1991 | Tonelli | 119/14.55 |
| 5,080,041 A | 1/1992 | Steingraber | 119/14.55 |
| 5,291,853 A | 3/1994 | Steingraber et al. | 119/14.54 |
| 5,345,890 A * | 9/1994 | Petersson et al. | 119/14.54 |
| D372,566 S | 8/1996 | Chowdhury | 119/14.54 |
| D384,445 S | 9/1997 | Chowdhury | 119/14.54 |
| 5,988,105 A | 11/1999 | Sandgren | 119/14.54 |
| 6,006,695 A | 12/1999 | Gustafsson | 119/14.54 |
| 6,058,880 A | 5/2000 | Gustafsson et al. | 119/14.54 |

FOREIGN PATENT DOCUMENTS

| | | | | |
|---|---|---|---|---|
| GB | 9201848 A1 * | 4/1994 | | A01J/5/04 |
| NZ | 9300034 A1 * | 5/1993 | | |

* cited by examiner

*Primary Examiner*—Robert P. Swiatek
*Assistant Examiner*—Bethany L. Griles
(74) *Attorney, Agent, or Firm*—Foley & Lardner

(57) ABSTRACT

A milking claw includes a milk bowl with an interior having an inner bottom surface, an inner top surface and an inner sidewall surface between the inner top and bottom surfaces. Milk inlets are formed in the bowl and open into the interior of the bowl through the inner top surface and are connected to milk hoses leading to the teat cups. A hollow outlet tube is mounted to the bowl with an intake end spaced above and closely adjacent to the inner bottom surface of the bowl. The outlet tube extends upwardly and sidewardly from the intake end within the interior of the bowl, and extends through the inner sidewall surface to an exit end outside of the bowl. The outlet tube is preferably smoothly curved within the interior of the bowl so that milk is drawn out of the bowl with minimal turbulence and reduced vacuum pressure drop.

17 Claims, 4 Drawing Sheets

SIDE OUTLET MILKING CLAW

FIELD OF THE INVENTION

This invention pertains generally to the field of milking equipment, and particularly to the milking claw used with the teat cup cluster that receives the milk from the animal being milked.

BACKGROUND OF THE INVENTION

Modern milking machines, particularly those used for milking cows, have several teat cups (four for milking a cow) which are connected by hoses to the inlets of a milking claw. The claw has a bowl that acts as a temporary receiver for the milk from each of the teat cups. The bowl of the claw is connected to a milk hose to which a vacuum is applied to draw the milk out of the bowl and through the milking hose to, e.g., a common milk line which serves several milking stations in a milking parlor. In a conventional milking claw design, the milk inlets are mounted to a top side of the bowl and will be facing upwardly when teat cups are attached to the cow for milking, and an outlet is formed at the bottom of the bowl through which milk is drawn out via an outlet tube to the milk hose. An example of this conventional arrangement is shown in U.S. Pat. No. 5,080,041. To avoid certain problems encountered with bottom outlet milking claws, top outlet claws were developed in which an outlet tube extends from an intake opening spaced closely adjacent to the bottom of the bowl. The outlet tube extends upwardly through the top of the bowl to a position adjacent to the milk inlets, where it is connected to the milk hose. Examples of top outlet claws are shown in U.S. Pat. Nos. 4,136,639, 5,052,341, 5,076,221, 5,291,853, 5,988,105, 6,006,695, 6,058,880, D372,566 and D384,445.

Top outlet claws generally have the advantage of drawing the milk out of the milk claw bowl more or less continuously in small spurts, so that large slugs of milk are not drawn into the milk hose. In the typical top outlet claw, a vertical section of the outlet tube is covered by a cap which can be opened to allow inspection of the milk tube and particularly the weld joint at which a metal outlet tube is joined to the metal body of the bowl. Top outlet claws typically have a horizontal section of the outlet tube that extends at a right angle from the vertical section and is connected to the milk hose. As the milk exits the bowl through the outlet tube, it must turn a sharp right-angled corner to transfer from the vertical tube to the horizontal tube, resulting in turbulence in the milk flow. This turbulence can contribute to an undesirable pressure drop from the milking claw to the milk line and may unnecessarily agitate the milk as it passes through. The right-angle bend or cap assembly may also accumulate milk residue which must then be periodically cleaned out. Top outlet tube designs which curve from the horizontal section to the vertical section, rather than having a right-angle joint, have generally not been acceptable for sanitation purposes because the weld joint between the outlet tube and the claw body is not accessible for visual inspection. Top outlet claws draw milk to a greater height than bottom outlet claws, which may contribute to an undesirable pressure drop from the milking claw to the milk line. Top outlet claws also have all the hoses associated with the claw (milk inlet and outlet hoses, pulsation hoses and pulsation hose manifold) in the space above the claw between the milk inlets, which can congest this space and interfere with handling.

SUMMARY OF THE INVENTION

The milking claw of the present invention utilizes the benefits of conventional top outlet claws, with the outlet tube having an intake opening spaced closely adjacent to the bottom surface of the milking bowl, while providing a reduced pressure loss and smooth milk flow as the milk exits the milking claw. As milk enters the bowl of the claw, the intake opening is covered and uncovered many times per second as the milk is drawn out through the outlet tube in droplets rather than in slugs, providing efficient, continuous milk removal with almost no milk accumulation in the milking bowl. Minimizing the amount of milk in the bowl during milking increases the vacuum reserve and thus minimizes the degree of vacuum fluctuation during normal milking, as well as reducing the free milk available in the claw to be backwashed to the teat ends during abnormal milking events such as slippage of teat cups.

The milking claw of the present invention includes a milk claw bowl with an interior having an inner bottom surface, an inner top surface, and an inner side wall surface between the inner top and bottom surfaces. At least one, and generally four milk inlets are formed in the bowl and open into the interior of the bowl through the inner top surface. These inlets are connected to the milk tubes or hoses leading to the teat cups. A hollow outlet tube is mounted to the bowl with an intake end spaced above and closely adjacent to the bottom surface of the bowl. The outlet tube extends upwardly and sidewardly from the intake end within the interior of the bowl, and extends through the inner sidewall surface to an exit end outside of the bowl. The outlet tube thus extends out of the bowl at a position between the top and bottom of the bowl. The section of the outlet tube which is outside of the bowl is preferably straight to allow unimpeded visual inspection of the weld joint between the outlet tube and the body of the bowl. The outlet tube is preferably curved smoothly from the intake end to the position at which it joins and passes through the inner sidewall surface of the bowl, thus providing smooth flow of milk through the outlet tube with minimum turbulence and minimum pressure drop within the tube. The smoothly curved outlet tube does not collect milk residue and is readily cleaned during the conventional flushing operations for the teat cups after milking has been completed.

While various bowl designs may be utilized, a preferred bowl design includes a cylindrical body formed of stainless steel having two circular open ends, with two circular windows mounted to the open ends of the cylindrical body to close the interior of the bowl. The inner surface of the cylindrical body includes the top and bottom inner surfaces and the sidewall surface. A hanger may be mounted to the cylindrical body above the top inner surface by which the teat cup cluster may be supported at the end of a support arm. Because the top of the cylindrical body does not have the milk outlet tube extending from it, the hanger can be mounted directly to the cylindrical body (typically centered between the milk inlets), rather than being mounted to the outlet tube at a position above the bowl. Because the outlet tube extends out the side of the bowl where it is connected to the milk hose, the other hoses required for milking (e.g., pulsation hose, pulsation hose manifold) and ancillary equipment such as automatic vacuum shutoff, automatic teat end sanitizing controls, etc., have more space available for mounting in a location adjacent the top of the claw and the milk inlets.

Further objects, features and advantages of the invention will be apparent from the following detailed description when taken in conjunction with the accompanying drawings.

DETAILED DESCRIPTION OF THE PREFERRED EMBODIMENTS

Figure 1:
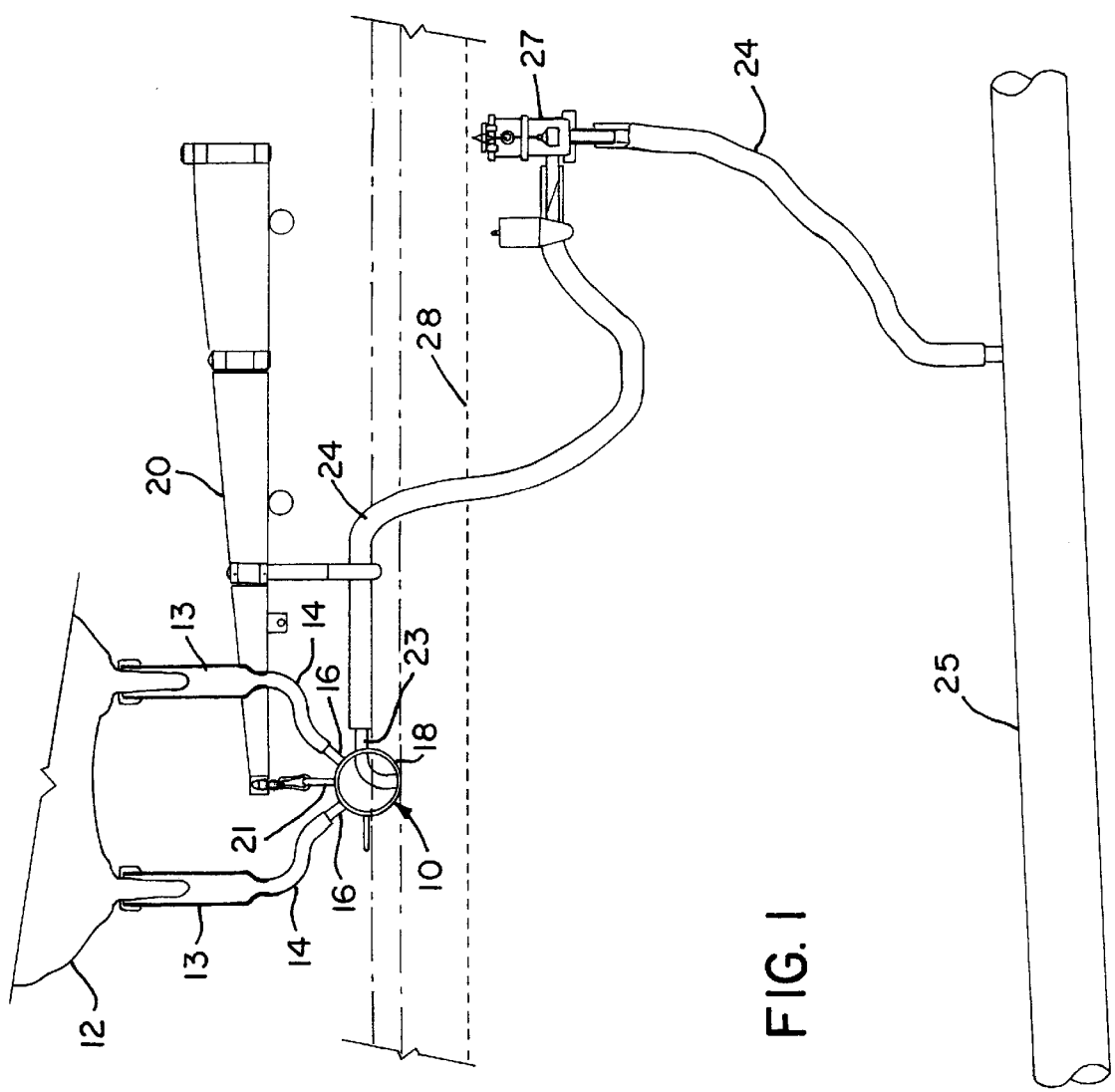
FIG. 1 is simplified view of a portion of a milking system including a teat cup cluster with milking claw in accordance with the invention.
Figure 2:
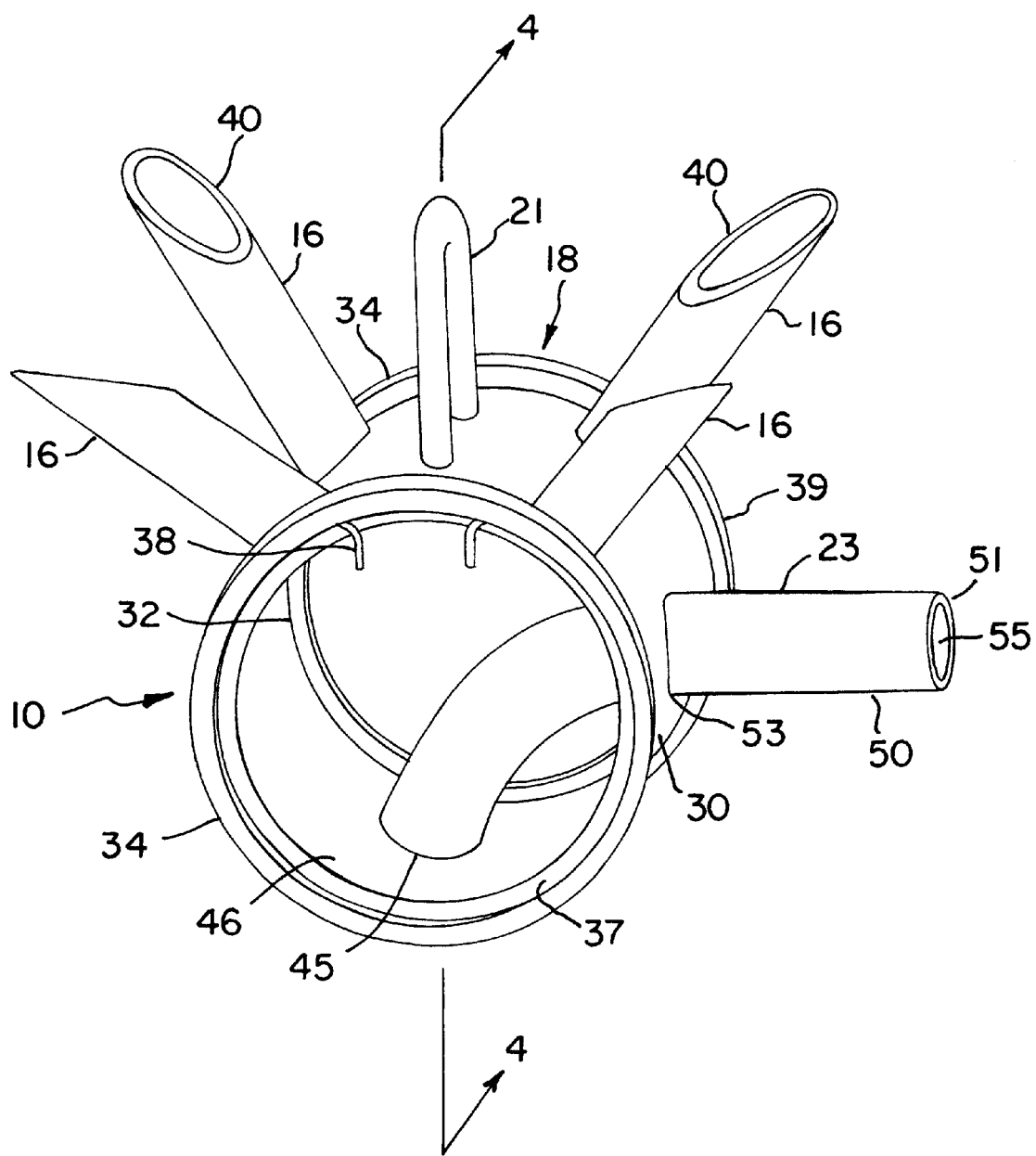
FIG. 2 is a perspective view of the milking claw of the invention.

With reference to the drawings, a milking claw in accordance with the invention is shown generally at 10 in conjunction with a portion of a milking system of the type utilized in automated milking parlors. The milking system is shown in FIG. 1 in position for milking a cow 12 with teat cups 13 attached to the teats of the udder. The milk is directed from the inflations of the teat cups 13 through flexible milk tubes or "short milk hoses" 14 through inlets 16 to a milking claw bowl 18 of the claw 10. The claw 10 is supported by a teat cup cluster support arm 20 that is connected to a hanger 21 of the milking claw. The milk exits from the bowl 18 of the claw through an outlet tube 23 to which a milk hose 24 is coupled. The milk hose 24 is connected to a milking line 25 that is under a milking vacuum so as to draw the milk from the milk hose 24 into the milk line 25. For purposes of illustration, a milk flow sensor 27 is shown connected in the milk line 24 to sense milk flow and provide an indication when the cow has been milked out so that the teat cups 13 may be automatically detached from the cow. As illustrated in FIG. 1, the support arm 20 is connected to the claw 10 to support it at a desired height above the platform 28 on which the cow stands. As can be seen from FIG. 1, the outlet tube 23 extends out from the bowl 18 in a sideways direction at a position between the top side of the bowl at which the inlets 16 are formed and the bottom of the bowl. This side outlet arrangement allows the milk hose 24 to be readily connected to the outlet tube 23 without interference with the milk inlet 16, the milking hoses 14 or the hanger 21.

Figure 3:
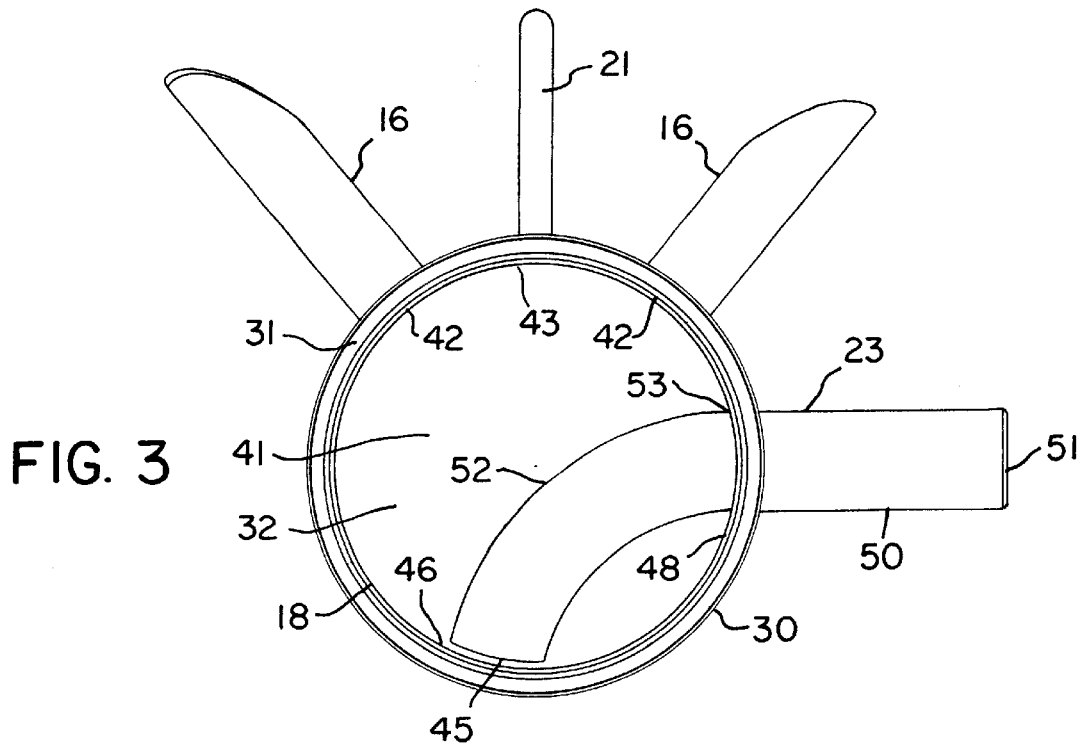
FIG. 3 is a side view of the milking claw of FIG. 2.
Figure 4:
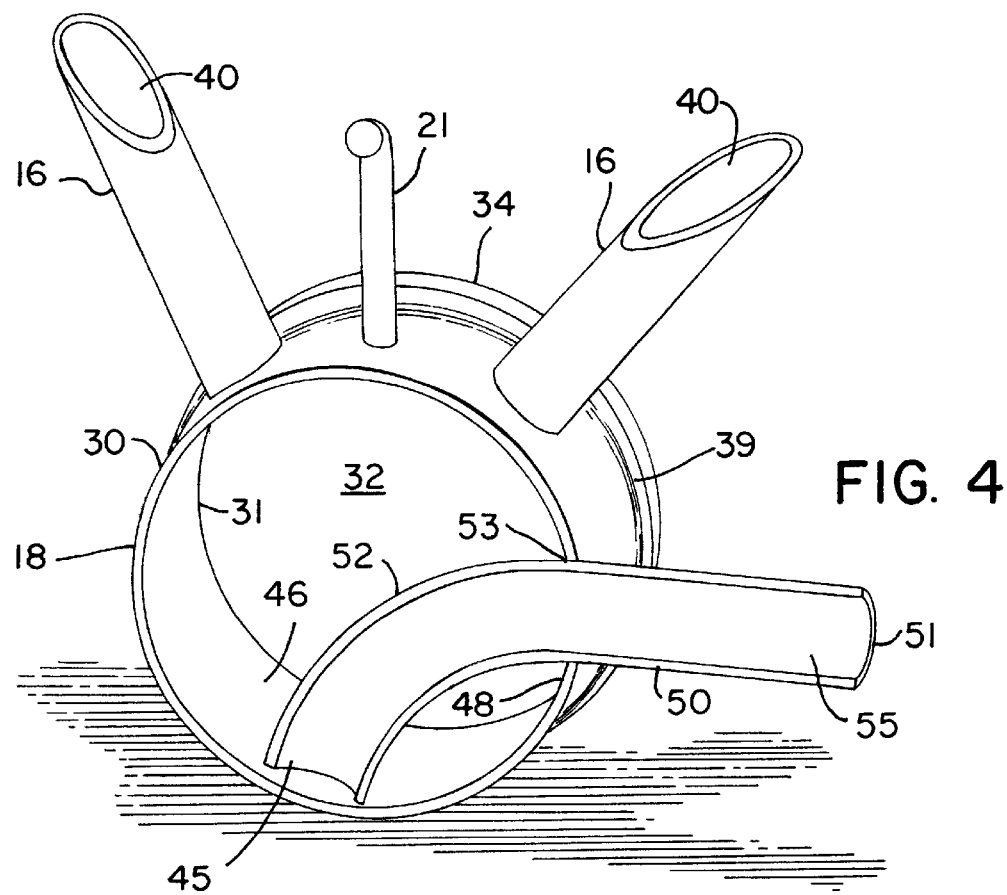
FIG. 4 is a cross-sectional perspective view of the milking claw of FIG. 2, taken generally along the lines 4—4 of FIG. 2.
Figure 5:
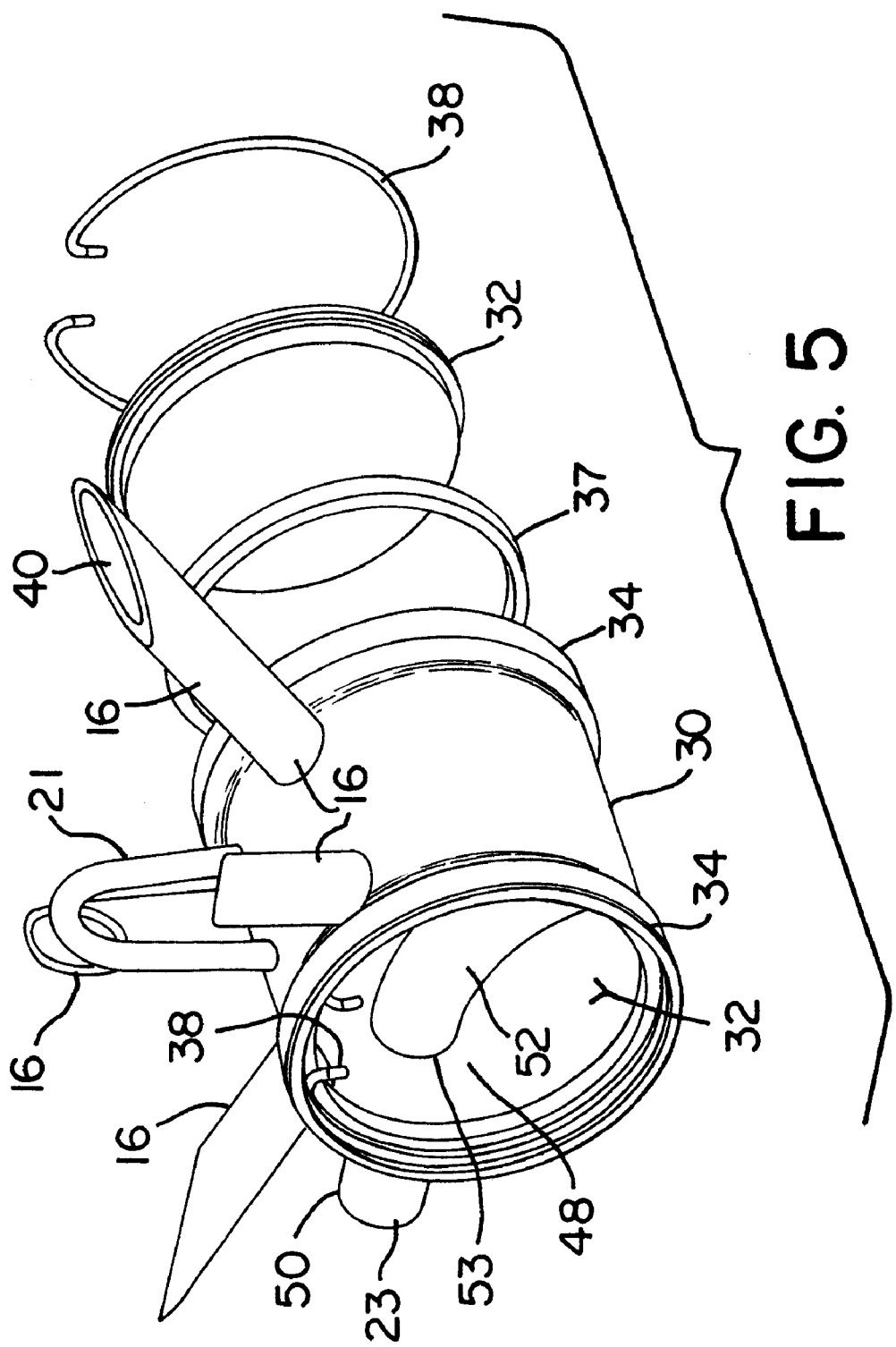
FIG. 5 is a partially exploded perspective view of the milking claw of FIG. 2 illustrating one manner of attachment of the windows to the body forming the bowl of the milking claw.

A preferred embodiment for the milking claw of the invention is shown in FIGS. 2–5 that has a cylindrical type milking claw bowl 18, although it is understood that the invention may be utilized with other types of bowls for milking claws. The bowl 18 has a cylindrical body 30 with two circular open ends 31 that are closed by transparent circular windows 32. The cylindrical body 30 may typically be formed of stainless steel and have expanded flanges 34 around the openings 31 to form a ledge into which the transparent windows 32 can be seated. These flanges also serve to structurally reinforce the cylindrical body. The windows 32 may be formed of various transparent materials such as glass or preferably plastic such as polycarbonate, polysulfone, etc. The windows may be secured in place to close the ends of the cylindrical body 30 utilizing a gasket 37 to seal the window to the body 30, and a snap-ring 38 that is assembled to snap in place over the window 32, as illustrated in FIG. 5. A conventional air bleed hole may be provided. The inlets 16 may be formed of hollow stainless steel tubes welded to the cylindrical body 30 having interior bores 40 that open into the enclosed interior 41 of the bowl 18 at openings 42 in the top inner surface 43 of the bowl. The above-described structure of the bowl 18 is conventional, and it is understood that any other convenient bowl construction may be utilized.

In the present invention, the outlet tube 23 has an intake opening 45 which is positioned spaced from and closely adjacent to a bottom inner surface 46 of the bowl (a portion of the inner surface of the cylindrical body 30 of the bowl), and extends upwardly and sidewardly through an inner side surface 48 of the bowl (an inner side surface of the cylindrical body 30) to a straight section 50 of the outlet tube 23 that extends outwardly from the bowl 18 to an exit opening 51 outside of the bowl 18. The section 52 of the outlet tube within the interior 41 of the bowl preferably curves smoothly from the intake end 45 upwardly and sidewardly to the position 53 at which the intake tube meets the inner side surface 48 and is joined to the body 30 of the bowl 18. The outlet tube 23 is preferably formed as a continuous tube of, e.g., stainless steel, which may be assembled to the body 30 by being passed through an opening formed in the body 30 at the position 53 until the intake end 45 is at the desired location adjacent to the bottom inner surface 46, with the outlet tube 23 then being welded to the stainless steel body 30 at the juncture 53. Because the outer section 50 of the tube 23 is straight, the interior bore 55 of the tube 23 can be visually inspected through the opening at the exit end 51, and allowing an unimpeded view of the interior bore 55 of the tube at the juncture 53 at which the tube is welded to the body 30.

As illustrated in the cross-sectional perspective view of FIG. 4, the smoothly curved interior bore 55 in the inner section 52 of the outlet tube 23 allows milk being drawn through the outlet tube to flow smoothly and with minimum turbulence through the curved section, minimizing undue agitation of the milk and minimizing the pressure drop between the intake end 45 and exit end 51 of the outlet tube as compared to conventional top outlet claws in which the outlet tube has a right-angled bend. In addition, because the outlet end 51 of the tube is located at a position midway between the top and bottom of the claw body, and a relatively short distance above the intake end 45, the amount of vacuum draw lost in raising the milk (pressure drop required to raise the milk) from the level of the intake end 45 to the exit end 51 is less than the vacuum draw that is lost in raising the milk to a position above the top of the milking claw before exiting, as in conventional top outlet milking claws, resulting in higher average claw vacuum levels and lower vacuum fluctuations. Furthermore, as is clear from FIG. 4, the smoothly curved tube section 52 has no barriers or impediments to milk flow that would unnecessarily agitate the milk or provide positions at which milk residue can accumulate.

As illustrated in FIG. 3, the intake end of the outlet tube 23 is preferably positioned closely adjacent to the bottom inner surface 46 of the milk bowl 18, which has a cylindrical curve defined by the cylindrical body 30 of the bowl. Of course, the invention may be utilized with other types of bowls having a flat or elevated bottom inner surface. The spacing between the intake end 45 and the adjacent inner bottom surface 46 may be chosen as desired and will typically be in the range of ⅛ inch or less. The intake end 45 may be curved as shown in FIG. 3 to match and parallel the curve of the inner bottom surface 46, or it may be flat. One advantage of the present invention is that the curved section 52 of the outlet tube may be formed to position the intake end 45 at positions which may be other than directly under the hanger 21 (i.e., at an angle other than 90 degrees with respect to the straight section 50 of the outlet tube). With conventional top outlet claws having a straight vertical tube section, the position of the intake end of the tube must be located directly opposite the position at which the outlet tube enters the bowl. The intake end 45 of the outlet tube in the present invention can thus be positioned so it will be at the lowest average position of the milking bowl 18 during milking, as the pull exerted by the teat cups on the milking bowl may tend to displace it at an angle from the upright position shown in, e.g., FIG. 3.

The present invention may utilize conventional dimensions for the diameter of the cylindrical body 30 (e.g., about three inches) and for the bores of the inlet 16 and the outlet tube 23, including conventional inlet bore diameters of ⅜ to ½ inch and conventional outlet bore 55 diameters in the range of ⅝ inch and 1 inch. The claw of the invention may also include conventional features such as the bleed hole 39 to allow relief of the vacuum in the interior of the bowl, which may be located at other conventional positions, such as being formed through one of the windows 32.

As well illustrated in FIG. 1, because the outlet tube 23 extends out through a side of the milking bowl, neither the outer section 50 of the outlet tube nor the milk hose 24 interfere with or affect the positioning of the hanger 21 or the short milk hoses 14. The hanger 21 can be directly connected to the body 30 of the bowl, rather than to the outer section of the outlet tube as in conventional top outlet claws. This feature further allows the claw 10 to be hung at a position closer to the support arm 20 and thereby allow closer control over the height of the milking claw and its position with respect to the udder.

It is understood that the invention is not confined to the embodiments set forth herein as illustrative, but embraces all such forms thereof as come within the scope of the following claims.

What is claimed is:

1. A milking claw comprising:
    (a) a milking claw bowl with an interior having an inner bottom surface, an inner top surface, and an inner sidewall surface between the inner top and bottom surfaces;
    (b) at least one milk inlet which opens into the interior of the bowl through the inner top surface of the bowl; and
    (c) a hollow outlet tube mounted to the bowl with an intake end of the outlet tube spaced above and closely adjacent to the inner bottom surface of the bowl, the outlet tube extending upwardly and sidewardly within the interior of the bowl and joined to and extending through the inner sidewall surface to an exit end of the outlet tube that is located outside of the bowl.

2. The milking claw of claim 1 wherein the outlet tube extends upwardly and sidewardly from its intake end in a smooth curve.

3. The milking claw of claim 1 wherein there are four milk inlets opening into the interior of the bowl through the inner top surface of the bowl.

4. The milking claw of claim 3 wherein each inlet comprises a tube extending outwardly to a terminal opening and having an interior bore in communication with the interior of the bowl.

5. The milking claw of claim 1 including a hanger attached to the bowl above the inner top surface of the bowl.

6. The milking claw of claim 1 wherein the bowl has a cylindrical body with a cylindrical inner surface that includes the inner top surface, inner bottom surface, and the inner sidewall surface of the bowl, the cylindrical body having two circular open ends, and two circular windows mounted to the open ends of the cylindrical body to close the interior of the bowl.

7. The milking claw of claim 6 wherein the cylindrical body is formed of stainless steel and the windows are formed of transparent plastic.

8. The milking claw of claim 6 including a hanger attached to the bowl above the inner top surface of the bowl and wherein the intake end of the outlet tube is offset from the position at the inner bottom surface that is diametrically opposite the position at which the hanger is attached to the bowl.

9. The milking claw of claim 1 wherein the section of the outlet tube outside of the bowl is straight to allow thereby an unimpeded view of the interior bore of the outlet tube to the position at which the outlet tube is joined to the bowl.

10. A milking claw comprising:
    (a) a milking claw bowl with an interior including an inner bottom surface, an inner top surface, and an inner sidewall surface between the inner top and bottom surfaces, the milking claw bowl including a cylindrical body having a cylindrical inner surface which includes the inner top surface, inner bottom surface and inner sidewall surface of the bowl, the cylindrical body having two circular open ends, and two circular windows mounted to the open ends of the cylindrical body to close the interior of the bowl;
    (b) a plurality of inlet tubes mounted to the cylindrical body of the bowl and opening into the interior of the bowl through the inner top surface of the bowl; and
    (c) a hollow outlet tube mounted to the cylindrical body of the bowl with an intake end spaced above and closely adjacent to the inner bottom surface of the bowl, the outlet tube extending upwardly and sidewardly within the interior of the bowl and joined to and extending through the inner sidewall surface to an exit end at a position outside the bowl.

11. The milking claw of claim 10 wherein the outlet tube extends upwardly and sidewardly from its intake end in a smooth curve.

12. The milking claw of claim 10 wherein there are four inlet tubes mounted to the cylindrical body and opening into the interior of the bowl through the inner top surface of the bowl.

13. The milking claw of claim 12 wherein each inlet tube extends outwardly to a terminal opening and has an interior bore in communication with the interior of the bowl.

14. The milking claw of claim 10 including a hanger attached to the bowl above the inner top surface of the bowl.

15. The milking claw of claim 10 wherein the cylindrical body is formed of stainless steel and the windows are formed of transparent plastic.

16. The milking claw of claim 10 including a hanger attached to the bowl above the inner top surface of the bowl and wherein the intake end of the outlet tube is offset from the position at the inner bottom surface that is diametrically opposite the position at which the hanger is attached to the bowl.

17. The milking claw of claim 10 wherein the section of the outlet tube outside of the bowl is straight to allow thereby an unimpeded view of the interior bore of the outlet tube to the position at which the outlet tube is joined to the bowl.

* * * * *